US008685281B2

(12) United States Patent
Bingham et al.

(10) Patent No.: US 8,685,281 B2
(45) Date of Patent: Apr. 1, 2014

(54) SYSTEM AND PROCESS FOR THE PRODUCTION OF SYNGAS AND FUEL GASSES

(75) Inventors: Dennis N. Bingham, Idaho Falls, ID (US); Kerry M. Kllingler, Idaho Falls, ID (US); Terry D. Turner, Idaho Falls, ID (US); Bruce M. Wilding, Idaho Falls, ID (US); Bradley C. Benefiel, Idaho Falls, ID (US)

(73) Assignee: Battelle Energy Alliance LLC, Idaho Falls, ID (US)

( * ) Notice: Subject to any disclaimer, the term of this patent is extended or adjusted under 35 U.S.C. 154(b) by 87 days.

(21) Appl. No.: 13/188,167

(22) Filed: Jul. 21, 2011

(65) Prior Publication Data
US 2013/0020538 A1  Jan. 24, 2013

(51) Int. Cl.
C01B 3/38 (2006.01)
C01B 3/24 (2006.01)

(52) U.S. Cl.
USPC ......................... 252/373; 423/650

(58) Field of Classification Search
USPC ....................................................... 252/373
See application file for complete search history.

(56) References Cited

U.S. PATENT DOCUMENTS

| 2,754,187 | A | * | 7/1956 | Bond, Jr. et al. ............. 48/127.5 |
| 3,252,774 | A | * | 5/1966 | McMahon et al. .......... 48/214 R |
| 3,567,412 | A | * | 3/1971 | Lefrancois et al. ............. 48/202 |
| 3,876,527 | A | | 4/1975 | Dugan et al. |
| 3,916,617 | A | | 11/1975 | McKenzie et al. |
| 4,017,271 | A | * | 4/1977 | Barclay et al. .............. 48/197 R |
| 4,092,236 | A | | 5/1978 | Heredy |
| 4,367,077 | A | * | 1/1983 | Tao ................................. 48/213 |
| 7,078,012 | B2 | | 7/2006 | Bingham et al. |
| 7,153,489 | B2 | | 12/2006 | Bingham et al. |
| 7,279,077 | B2 | | 10/2007 | Bingham et al. |
| 7,294,323 | B2 | | 11/2007 | Klingler et al. |
| 7,665,328 | B2 | | 2/2010 | Bingham et al. |
| 2007/0095536 | A1 | | 5/2007 | Vinegar et al. |
| 2008/0141591 | A1 | | 6/2008 | Kohl |
| 2009/0074656 | A1 | | 3/2009 | Billings |
| 2013/0020232 | A1 | | 1/2013 | Turner et al. |
| 2013/0020236 | A1 | | 1/2013 | Turner et al. |

FOREIGN PATENT DOCUMENTS

JP            2011105807        *  6/2011

OTHER PUBLICATIONS

Lefrancois, et al., ACS Division of Fuel Chemistry, 152 nd ACS Nartional Meeting, pp. 198-205, 1966, NY,NY.*

* cited by examiner

*Primary Examiner* — Melvin C Mayes
*Assistant Examiner* — Kenneth Vaden
(74) *Attorney, Agent, or Firm* — Holland & Hart LLP

(57) ABSTRACT

The production of gasses and, more particularly, to systems and methods for the production of syngas and fuel gasses including the production of hydrogen are set forth. In one embodiment system and method includes a reactor having a molten pool of a material comprising sodium carbonate. A supply of conditioned water is in communication with the reactor. A supply of carbon containing material is also in communication with the reactor. In one particular embodiment, the carbon containing material may include vacuum residuum (VR). The water and VR may be kept at desired temperatures and pressures compatible with the process that is to take place in the reactor. When introduced into the reactor, the water, the VR and the molten pool may be homogenously mixed in an environment in which chemical reactions take place including the production of hydrogen and other gasses.

16 Claims, 11 Drawing Sheets

SYSTEM AND PROCESS FOR THE PRODUCTION OF SYNGAS AND FUEL GASSES

GOVERNMENT RIGHTS

This invention was made under a Cooperative Research and Development Agreement between Western Hydrogen and Battelle Energy Alliance, LLC under Contract Number DE-AC07-05ID14517 awarded by the United States Department of Energy. The government has certain rights in the invention.

TECHNICAL FIELD

The present invention relates the production of gasses and, more particularly, to systems and methods for the production of syngas and fuel gasses including the production of hydrogen.

BACKGROUND

Hydrocarbon based fuels (including petroleum products, natural gas, etc.) have been, and remain, a major source of global energy production. Projections of global oil reserves, the desire to provide more "green" or environmentally friendly energy, and many other issues have motivated individuals, companies and governments to research possible energy production alternatives. These research and development efforts have included the search for improved techniques, systems and methods for producing energy from existing, known energy sources. For example, efforts have been made regarding the ability to extract oil located in geophysical locations that are difficult to reach using conventional technology. Additionally, efforts have been made to make existing energy processes more efficient, more cost effective, and more environmentally friendly.

Other efforts have focused on extracting energy from reserves that have largely been ignored in the past. In some cases, these resources or reserves have been ignored because they are not as carbon rich as other available resources. In other instances it is simply more difficult to convert the resource into a useable form of energy. For example, substantial efforts have been made to extract oil from sources such as tar sands and oil shale. While technically feasible, extraction of oil from such sources in the past has conventionally been considered inefficient and ecologically unfriendly.

Current research has also focused on potential new sources of energy as well as improvement of other existing alternative energy sources. For example, efforts to improve solar technology, wind energy production, bio-fuel production and hydrogen production are all ongoing. However, as those of ordinary skill in the art will recognize, all of these efforts are met with various obstacles, some economical, some political, and some scientific.

As such, it is an ongoing desire to provide new sources of energy, to improve energy extraction efforts, and to improve existing processes and techniques so as to provide energy more efficiently, more abundantly, and in a more environmentally friendly manner.

BRIEF SUMMARY OF THE INVENTION

The present invention is related to the production of gasses and provides systems and methods for the production of syngas and fuel gasses such as hydrogen and methane. One embodiment of the present invention described herein includes a system and method that includes alkaline metal reforming (AMR). However, the process is applicable to a spectrum of energy conversion.

In accordance with one particular embodiment, a method of producing gas is provided. The method includes providing a molten pool within a reactor. The molten pool may include material such as sodium carbonate. An oxidizing material into the molten pool and a carbon containing material is introduced into the molten pool. The oxidizing material, the carbon containing material and the molten pool react to produce an output stream that includes a vapor comprising hydrogen.

The method may further include reacting the materials according the following equilibrium equation:

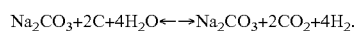

$$Na_2CO_3 + 2C + 4H_2O \leftarrow\rightarrow Na_2CO_3 + 2CO_2 + 4H_2.$$

The method may further include introducing vacuum residuum into the molten pool as the carbon source and introducing softened water into the molten pool as the oxidizer. In one embodiment, the vacuum residuum and the softened water may be mixed prior to being introduced into the molten pool.

The method may further include other acts such as extracting water from an output product of the reactor and recycling the water back to the molten pool within the reactor, separating gasses, liquids and solids according to various criteria, and extracting heat energy from the separation process for use, for example, in heating the molten pool or other constituents that are introduced into the molten pool.

In accordance with another embodiment of the present invention, a system for producing gas is provided. The system includes a reactor having a molten pool containing sodium carbonate, a supply of softened water in communication with the reactor, and a supply of vacuum residuum in communication with the reactor.

The system may additionally include various control systems. For example, a control system may be associated with the water supply to maintain the water supply at a desired temperature, a desired pressure and a desired flow rate. Likewise, a control system associated with the vacuum residuum supply to maintain the vacuum residuum supply at a desired temperature, a desired pressure and a desired flow rate.

The system may also be configured to mix the softened water and the vacuum residuum prior to their introduction into the molten pool. Once introduced into the molten pool, the system may be configured to keep the mixture in a substantially homogenous state at desire temperatures and pressures to effect a desired reaction. For example, the mixture may be maintained at temperature of approximately 930° C. or greater and at a pressure of approximately 13.9 MPa or greater.

The system may also include separation systems to separate gasses, liquids and solids that may be produced by the reactor. The separation system may be configured to extract water from the output and recycle the water back to the water supply. Additionally, soluble solids may be separated, dissolved in water and returned to molten pool.

Other various components and acts may be included in these methods and systems as described below and as will be appreciated by those of ordinary skill in the art.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Significant effort has been focused on energy conversion, energy efficiency, and the optimal use of resources in meeting the energy demands of mankind. The present disclosure describes the production of gasses and, more particularly, to systems and methods for the production of syngas and fuel gasses including the production of hydrogen. One embodiment of the present invention described herein includes a system and method that includes alkaline metal reforming (AMR). However, the process is applicable to a spectrum of energy conversion. Indeed, one benefit of the present invention is that a wide range of feed materials may be reformed into a more useful energy source. Feed materials generally include an oxidizing material and some form of hydrocarbon, though straight carbon is also useable. In one embodiment, the oxidizing component may include water and the hydrocarbon may include vacuum residuum (VR). VR is a material similar to road tar or asphalt that is produced during the vacuum distillation of crude oil and is generally perceived as having a low economic value. VR composition is largely carbon with a small percentage of hydrogen, even less sulfur and other trace elements as will be recognized by those of ordinary skill in the art.

Figure 1:
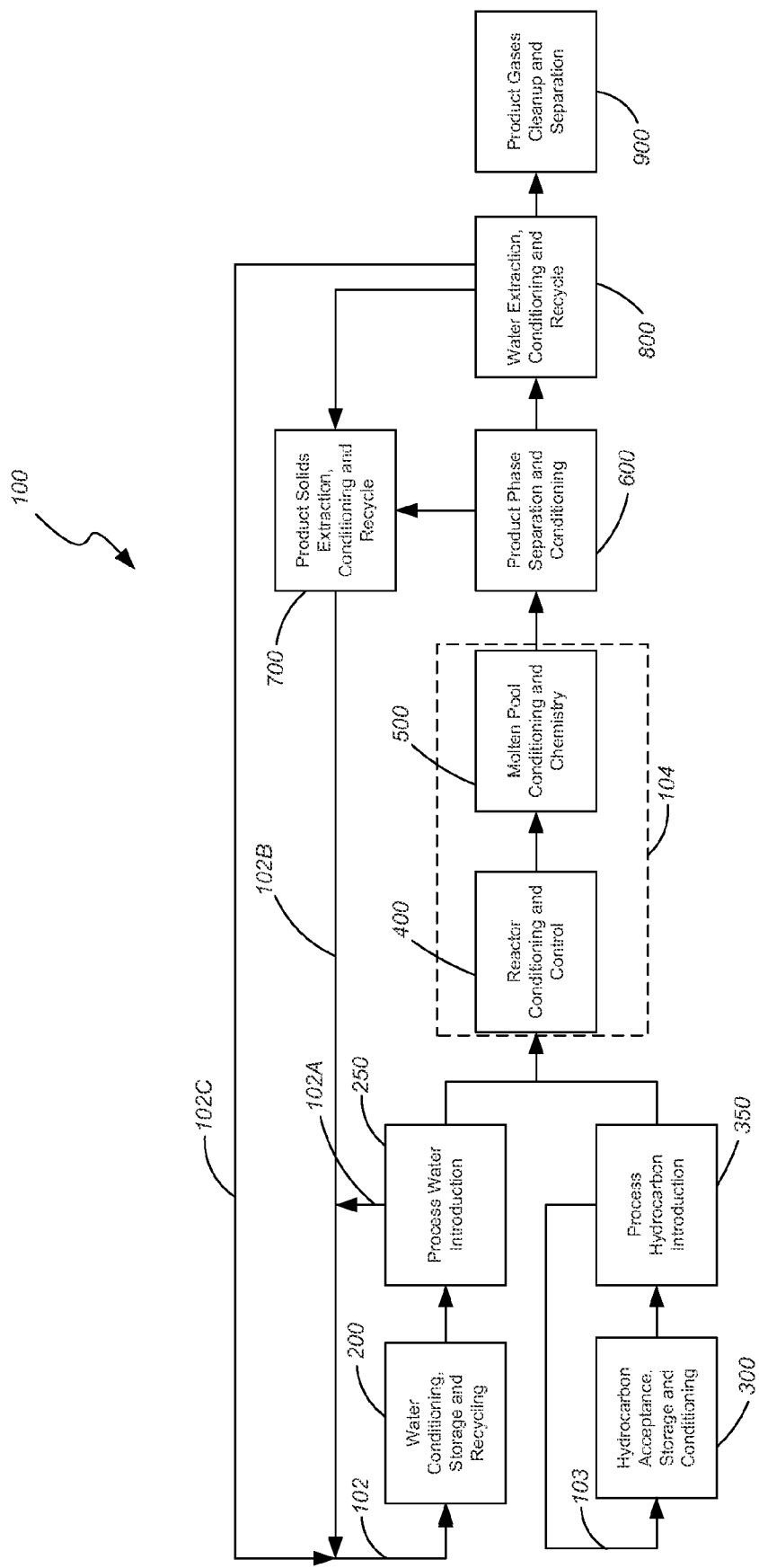
FIG. 1 is a block diagram of a system in accordance with one embodiment of the present invention.

Referring to FIG. 1, a block diagram shows an overview of an alkaline metal reforming system 100 and related process. The system 100 includes numerous subsystems or subprocesses which will be described in further detail below. The first subsystem or subprocess includes a water supply 200. The system or process associated with the water supply 200 may include various specific aspects, such as the conditioning, storage and recycling of water within the system 100. Associated with the water supply 200 is a water feed 250 process or system. As indicated by feedback line it 102A, the water feed 250 may recycle water back to the water supply 200. It is noted that feedback line 102A may combined with feedback lines 102B and 102C, as shown in FIG. 1, to form feedback line 102. Of course, the various feedback lines shown in FIG. 1 as being combined (as well as in other drawings presented herein) may remain as individual feedback lines in other configurations.

The system 100 also includes a hydrocarbon source 300 that will accept, store and condition hydrocarbons to be used within the system. Associated with the hydrocarbon source 300 is a hydrocarbon feed 350 process or system. As indicated by feedback line 103, the hydrocarbon feed 350 may recycle hydrocarbon material back to the hydrocarbon supply 300.

The water feed 250 and hydrocarbon feed 350 provide the materials needed to carry out desired chemical reactions to the reactor 104. The reactor 104 may include process or system control functions for reactor conditioning 400 and process or system control functions for molten pool conditioning 500. The reactor may include, for example, components such as described in U.S. application Ser. No. 13/188,121 entitled BELL COLUMN DOWN TUBE, or U.S. application Ser. No. 13/188,202 entitled MOLTEN SALT ROLLING BUBBLE COLUMN, both filed on even date herewith, the disclosures of each of which are incorporated by reference herein in their entireties.

The products exiting the reactor 104 may be subjected to various processes or systems such as product phase separation 600, solids extraction 700, water extraction 800 and gas clean up 900. It is noted that, while shown as distinct processes or systems, the separation processes may be intertwined and some of these processes may take place within the reactor 104 while not shown as such in FIG. 1. Each of these processes or systems is discussed in further detail below. The relationship and interaction of these process and systems with one another is indicated throughout the drawings using letters A-N. Thus, for example, FIG. 3 shows, at 226, a connection or input for "A or B" which refers to the inputs "A" and "B" shown in FIG. 2.

Figure 2:
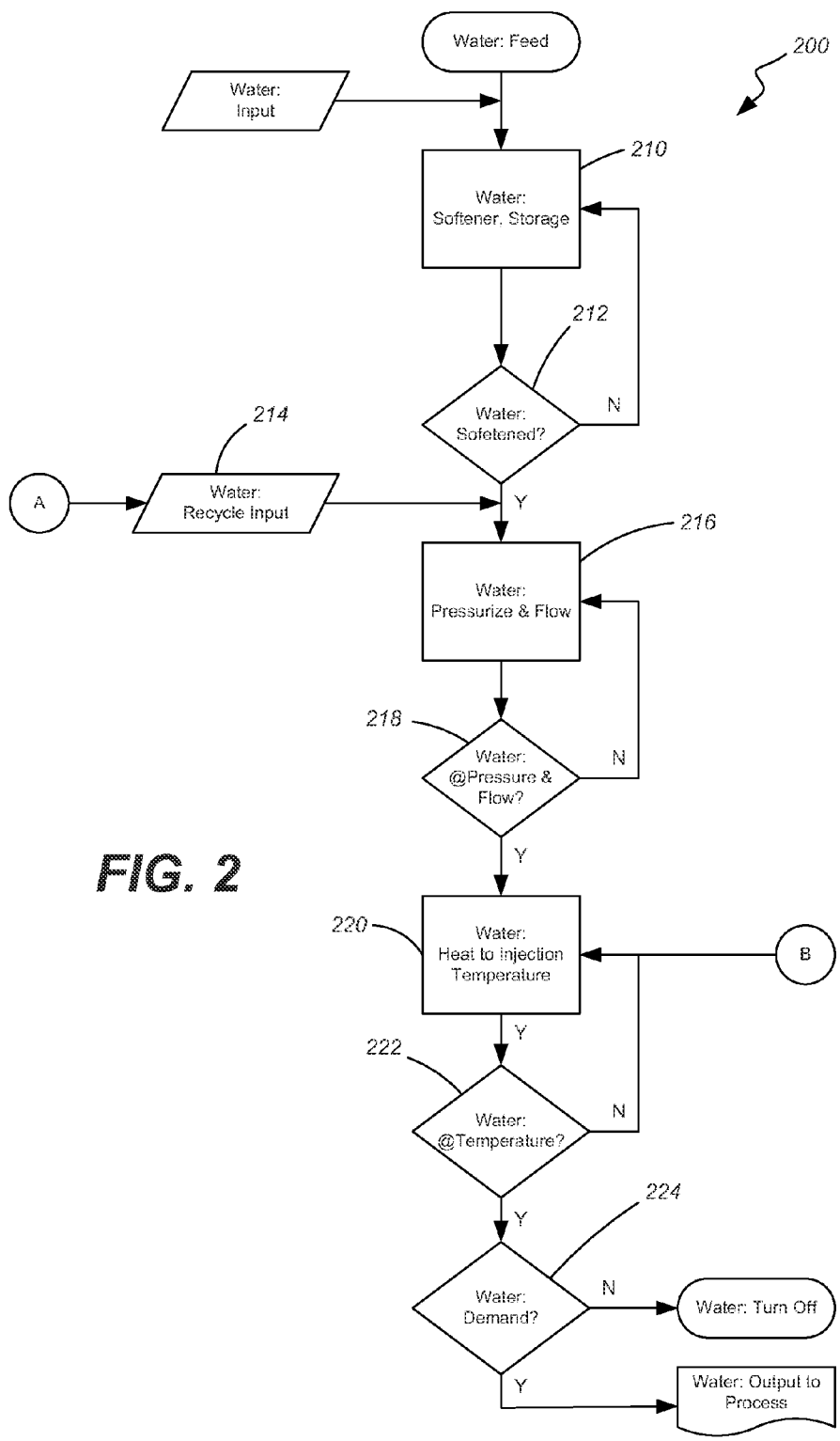
FIG. 2 is a flow diagram showing an example of a water conditioning, storage and recycling process that may be used in the present invention.
Figure 3:
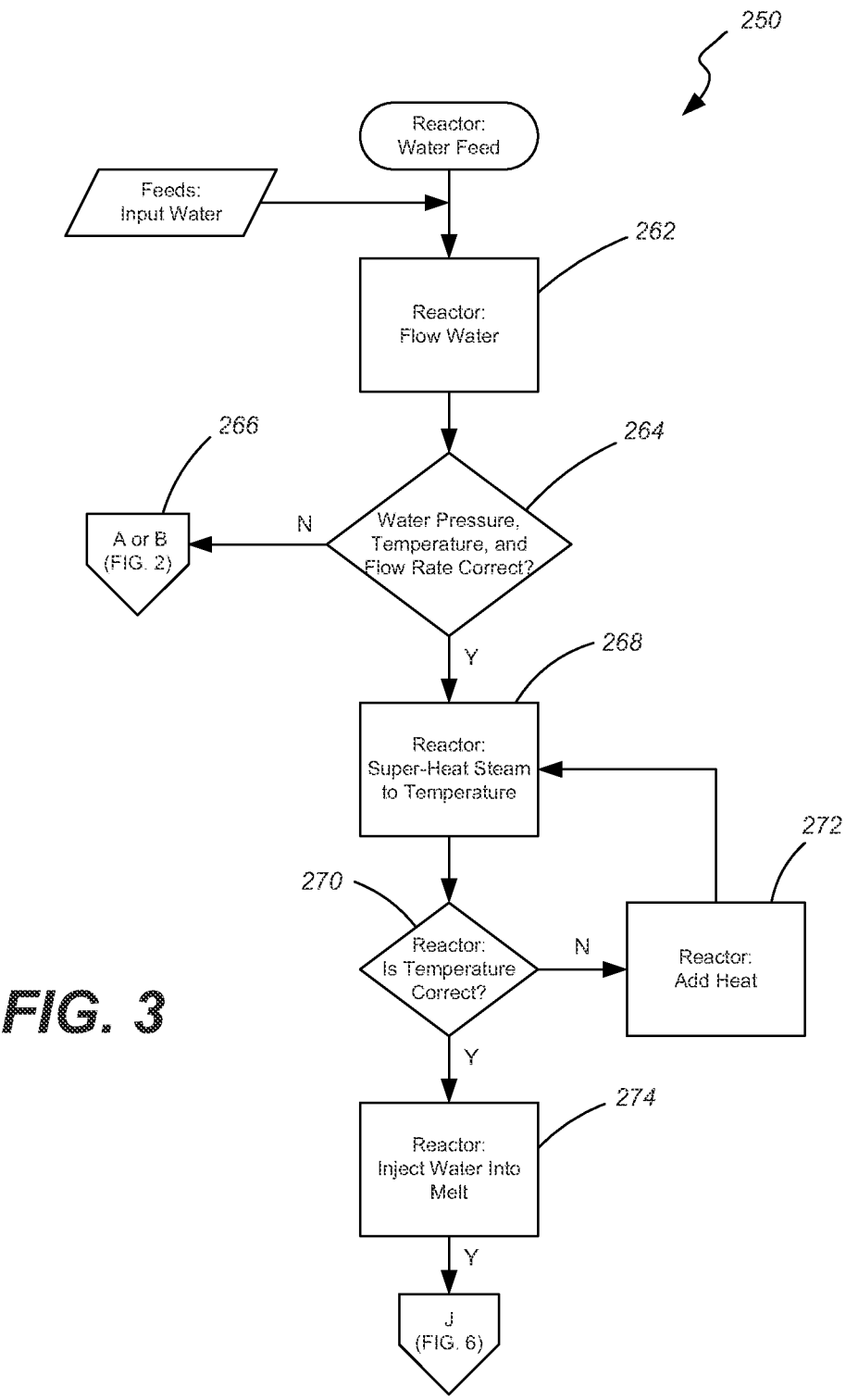
FIG. 3 is a flow diagram showing the introduction of process water in accordance with one embodiment of the present invention.

FIG. 2 shows the water supply for the entire process or system 100. It is noted that there is no redox chemistry (i.e., no reduction chemistry or oxidation chemistry) in the water feed system by design. Additionally, there need not be any user controllable chemistry associated with the water supply process. In certain embodiments, the chemistry associated with the water supply process may include conventional water softening technology. Water that is recycled through the system 100 is not necessarily softened again when it is returned through the water supply system or process 200. However, the composition of the water that is condensed from the product stream (i.e. following product phase separation 600 such as shown in FIG. 1) may be analyzed to determine whether or not minerals other than soluble sodium compounds should be added during routine operation of the system or process. During such analysis of the extracted water, a decision may also be made regarding the reuse of this water if, for example, it contains constituents that should not be put back into the reaction process.

In one embodiment, the water supply 200 takes water from a culinary source through a softening process 210 to remove most of the metal based minerals with the exception of perhaps sodium. This softened water is then stored for use. The water may require occasional checking to assess its mineral content and monitor the effectiveness of the softening process. For example, as indicated at 212, the water may be checked to determine whether the sufficiently treated and if necessary return to the water softening system. Likewise, should the recycled water require conditioning, it may be redirected to the proper location in the process for desired treatment.

Water that is being recycled from other locations in the process may be introduced, as indicated at 214, and combined with water from storage. The recycled water my actually be in a better state for use in the process than the softened water that is in storage. Indeed, in one embodiment, the softened water from storage may be added to the system only as makeup for that which is consumed during the chemical reactions that take place during the AMR process. As will be discussed below, excess water is condensed out of vapor streams produced during the process, to the degree that economics will allow, so that the water may be recycled.

After combining recycled water and the makeup water from water storage, the water may then be pressurized to the required process pressure in a sufficient quantity to meet the flow requirements of the process as indicated at 216. A closed loop control of the pressure and flow may be implemented, such as indicated at 218, to ensure that water conditions are correct for the process. The water that meets specified pressure and flow requirements may then be heated to a desired temperature as indicated at 220. The desired temperature will be one that is tolerated by the hardware of the system 100 while still satisfying the needs of the chemistry and the economics of the overall process. Closed loop control may be implemented, as indicated at 222, to ensure that the water temperature meets design requirements. Conditioned water at desired temperatures, pressures and flow rates may then be supplied to the water feed system as indicated at 224. There may be a concurrent check for water demand that allows the process to be stopped or continued at the proper conditions.

Referring now to FIG. 3, the process or system associated with water feed 250 is shown. The characteristics of the water (e.g., pressure, temperature and flow rate) are important to the overall process and may require constant monitoring and control. Thus, for example, as water is introduced into the reactor, as indicated at 262, controls may be used to determine whether characteristics such as water pressure, temperature and flow rate are at desired levels as indicated at 264. If the water characteristics are not at the desired levels, the water may be returned to the conditioning system 200 (i.e., at points A and/or B in the flow diagram of FIG. 2) as indicated at 266. Since water from the water supply 200 is conditioned to be in a state that matches process needs, it is introduced into a location where heat that is normally lost from the process can be used to superheat the water, as indicated at 268, and provide steam that is as near the reactor temperature as possible. Again, controls may be utilized to ensure the superheated steam is at the proper temperature as indicated at 270 and 272. When all parameters are in correct operating ranges, the water may be injected into the molten pool of the reactor as indicated at 274. In one embodiment, the molten pool may include a sodium salt.

Figure 4:
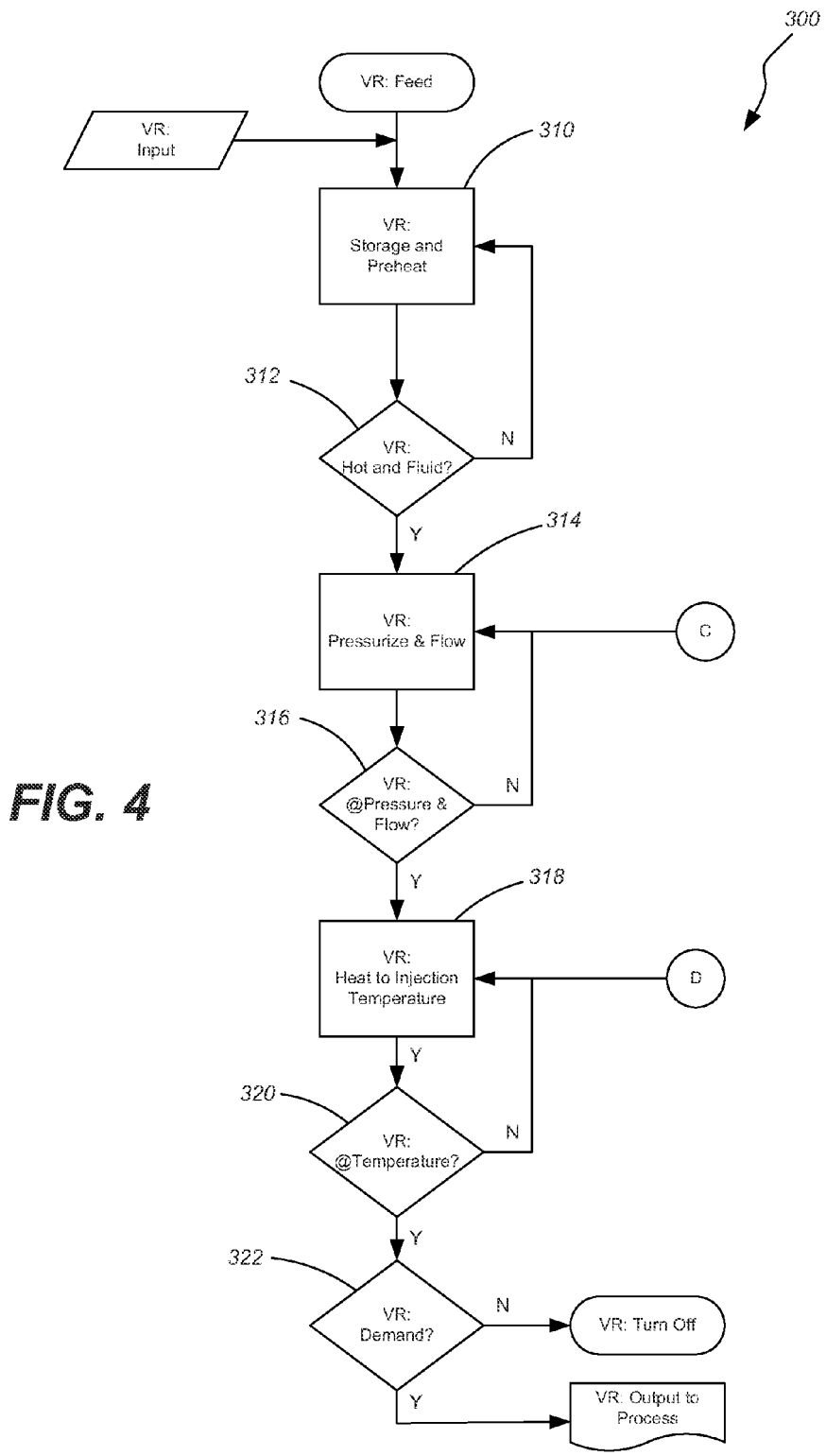
FIG. 4 is a flow diagram showing an example of a hydrocarbon acceptance, storage and recycling process that may be used in the present invention.
Figure 5:
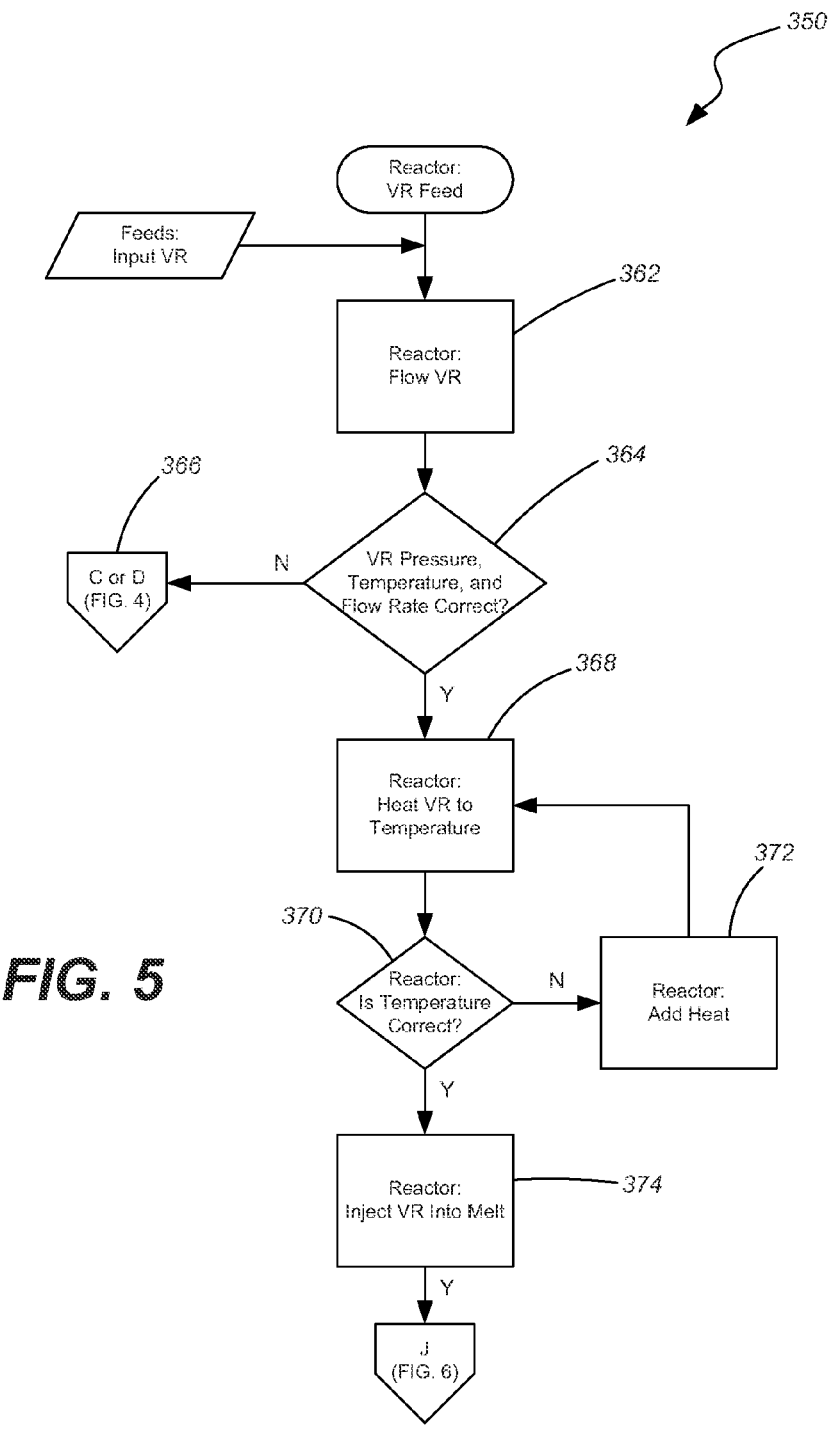
FIG. 5 is a flow diagram showing the introduction of process hydrocarbon in accordance with one embodiment of the present invention.

Referring now to FIG. 4, a process and system 300 for the acceptance, storage and conditioning of hydrocarbons is shown. In the currently described embodiment, the hydrocarbons are referred to as VR (vacuum residuum), however, other hydrocarbon sources may be utilized. It is noted that in one embodiment, the carbonaceous VR need not be pretreated before entering the VR feed loop 350 (FIGS. 1 and 5). This may require that a definition of acceptable limits for composition, temperature, pressure, viscosity, or wet ability properties be established for the VR feed material. These properties or characteristics may be specified, among other reasons, to help avoid coking and plugging of the hardware and flow lines of the system while still providing an acceptable product at the output of the process.

As VR is introduced to the process, it is stored and heated as indicated at 310. Closed loop control may be utilized to ensure that the VR is at a sufficient temperature as indicated at 312. Storage conditions are monitored and controlled to accommodate both the receiving and the dispensing of VR since the conditions of storage may be influenced by the conditions of the VR delivery process. For example, if VR is delivered to the process facility by way of a truck, it must still be in a fluid enough state to move it into storage. If it is supplied by pipeline, it must be maintained at a temperature that supports a fluid state for moving through the pipeline. Thus, the temperature and pressure of the VR storage should be compatible with both receiving and the dispensing requirements.

As VR is withdrawn from storage, it is pumped to a specified process pressure and is metered to the required flow rate, as indicated at 314, before adding any additional heat. Closed loop control may be implemented, as indicated at 316, to ensure that the VR pressure and flow rate are at desired levels for the process. Control of the pressure and flow rate of the VR early in the process enables better control of the process with fewer undesirable effects on downstream process variables and corresponding products. For example, more precise control of certain variables early in the process may translate into more efficient product stream cleanup and component separation later during the process.

After pressurization and metering, the stream of VR is again heated as indicated at 318. The VR stream is heated to a temperature where it does not volatilize and coke within the associated system piping. Avoiding volatilization and coking can be a difficult challenge if the bulk flow is to be of uniform temperature that is close to a coking temperature of the material. The heat transfer surfaces in this process must be at significantly higher temperatures than the bulk material in order maintain the bulk material at the desired conditions. However, these heat transfer surfaces may become nucleation sites for coking. As such, controls may be used to check and ensure that the temperature of the VR is at a desired level as indicated at 320. As shown at 322, there may be a check for demand from the associated hydrocarbon feed system 350 (FIGS. 1 & 5).

Referring now to FIG. 5, the hydrocarbon feed system or process 350 is shown including the pre-injection acts associated with introduction of VR into the reactor. As the VR proceeds into the reactor, as indicated at 362, the VR is checked for conditions such as flow, pressure, and temperature, as indicated at 364, to ensure that they meet process requirements. If the VR characteristics are not at the desired levels, the VR may be returned to the conditioning system 300 (i.e., at points C and/or D in the flow diagram of FIG. 4) as indicated at 366. If conditions of pressure and flow are acceptable, heat is added to the VR by the reactor, as indicated at 368, so as to bring it to the proper reaction temperature. Because this may result in the generation of coke in the areas of the reactor where digestion of carbon is designed to take place, VR is introduced into the reactor at temperatures below that of the reactor process. Thus, controls may be utilized to continually monitor and correct the temperature of the VR as indicated at 370 and 372. When all parameters are within acceptable operating ranges, the VR may be injected into the molten pool contained within the reactor as indicated at 374. In one embodiment, the VR may be mixed with at least a portion of the water/steam prior to introduction into the molten pool. Mixing of the VR and steam helps keep VR from coking on hot surfaces since, by mixing the VR with steam, a water vapor boundary layer may be formed between the hot surface of the reactor hardware and the VR. In other embodiments the VR is not mixed with any steam prior to injection into the molten pool.

Figure 6:
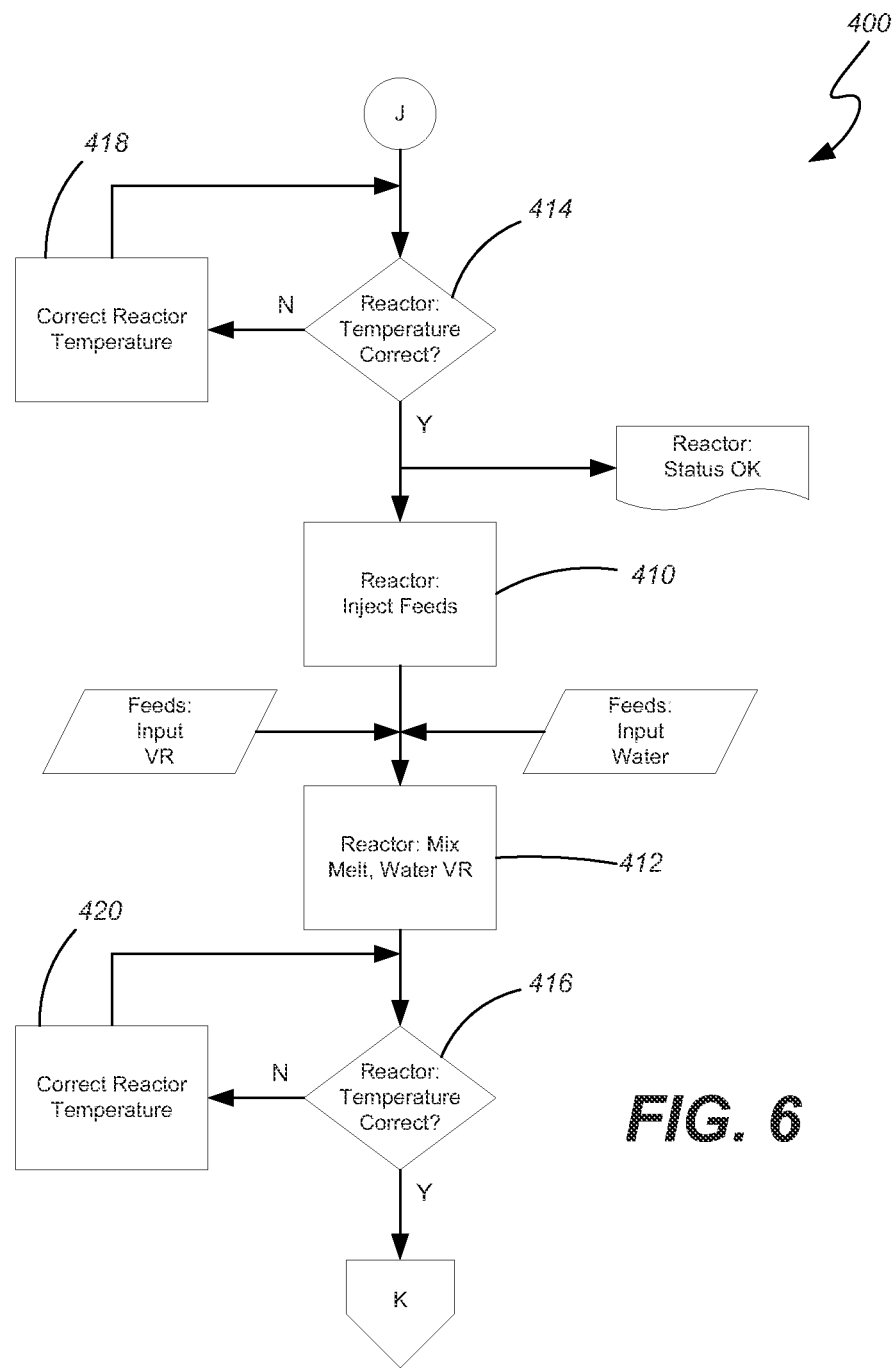
FIG. 6 is a flow diagram showing reactor conditioning and control in accordance with one embodiment of the present invention.

Referring now to FIG. 6, the process and system associated with reactor conditioning and control 400 is shown. The reactor conditioning and control largely entails the injection of the feeds (VR and water/steam) into the molten pool as indicated at 410, the mixture of the various components as indicated at 412, and the continued monitoring and control of the temperature of the reactor as indicated at 414, 416, 418 and 420. Control of the reactor may be structured to ensure that the temperature of the reaction, the associated hardware, and the reaction components are correct and that the contents of the reactor are homogeneously mixed. The temperature of the reactor contents should be uniform if it is well stirred. A substantially homogenous mixture implies that the steam exists in the slurry as uniformly distributed bubbles of a relatively small size. The VR on the other hand is most likely a mixture of volatized vapors and solids. This mixture of solids and gasses should approach homogeneity in order to effect efficient reactions within the melt. The need to efficiently transfer energy into or out of the reaction slurry at any particular rate is dependent on whether the reactions are endothermic or exothermic. Thus, the desire to constantly monitor and control the temperature of the reactor and its components.

Figure 7:
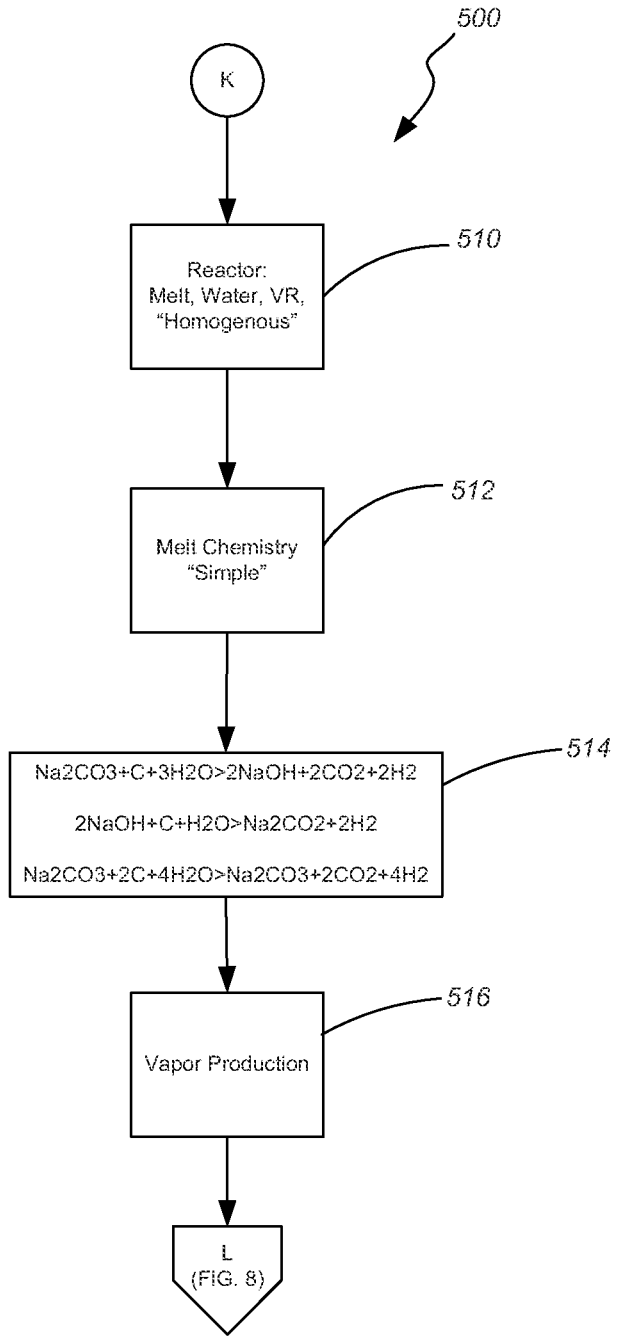
FIG. 7 is a flow diagram relating to molten pool conditioning, chemistry and control in accordance with one embodiment of the present invention.

Referring now to FIG. 7, conditioning and chemistry 500 associated with the molten pool is shown for an AMR process in accordance with an embodiment present invention. As noted above, the contents of the reactor may be uniformly stirred and agitated in order to provide and maintain a homogeneous mixture as indicated at 510. The process will result in some vapor production as indicated at 516. The following explanation of the chemistry that takes place within the reactor, based on modeling and experimental data, assumes that the chemistry taking place in the melt is simple in nature as indicated at 512. Additionally, it is assumed that the various phases of the materials do not affect the chemistry until some level of completion or equilibrium is achieved.

The existence of a homogenous mixture enables a much simpler approach for modeling the chemistry. Thus, for purposes of describing the chemistry of the present invention, in accordance with this embodiment, potential intermediary reactions may be kept to a minimum. The present description sets forth the end points or equilibrium constituents of the process while considering only two potential intermediary reactions such as are indicated at 514.

Based on experimental data and modeling, the first intermediary reaction will be the generation of sodium hydroxide from the sodium carbonate and the steam interaction as set forth in Equation 1 set forth below.

$$Na_2CO_3+C+3H_2O \rightarrow 2NaOH+2CO_2+2H_2 \qquad 1$$

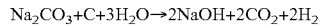

Again, based on experimental data and modeling, the second intermediary reaction will be the combination of sodium hydroxide, carbon, and water to generate sodium carbonate and hydrogen as set firth in Equation 2 set firth below.

$$2NaOH+C+H_2O \rightarrow Na_2CO_3+2H_2 \qquad 2$$

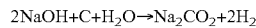

These two reactions are not necessarily the fundamental intermediaries as there are probably many others, as will be appreciated by those of ordinary skill in the art, that simple testing and modeling do not reveal.

The highest level equilibrium expression will be as set forth Equation 3 shown below.

$$Na_2CO_3+2C+4H_2O \leftrightarrow Na_2CO_3 2CO_2+4H_2, \qquad 3$$

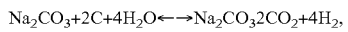

This is a simple sum of the intermediaries set forth in Equations 1 and 2 above. Based on a Gibbs free energy calculation, Equation 3 is really composed of many possible intermediaries so the stoichiometry may not look like that which is set forth above. To push this reaction to the right, heat will be added such that the temperature of the input stream will be raised. As an example, at 100° C. and a pressure of 139 bar (13.9 MPa), the reaction will produce little or no carbon dioxide and hydrogen, but as the temperature rises to 930° C. at the same pressure, half of the carbon and water will be converted to half the quantity of carbon dioxide and hydrogen. The water and carbon will remain as products on the right of the expression. The higher the temperature the more the Gibbs free energy equilibrium will look like Equation 3 if the species are limited to those in the expression shown. If one uses a larger number of species (e.g., 20-30), the equilibrium will shift away from that shown in Equation 3 such that, for example, the product stream will show a much lower production of $CO_2$ and $H_2$. It is noted that the process may take place at other temperatures and pressures. For example, lower pressures may be used, but subsequent post compression may then be required for any hydrogen product. Additionally, the pressures and temperatures may be modified depending on the end products being produced.

It is noted that the modeling of the above reaction is based on the premise of a homogeneous mixture of infinitesimally small parts. In actuality, the reaction will include various benefits and disadvantages that require recognition. For example, the mixture of constituents may not be homogeneous, but a complex mixture of phases and constituents. The separation of a gas phase and a liquid phase can be readily applied in the real world but is difficult to represent in the modeling world.

Figure 8:
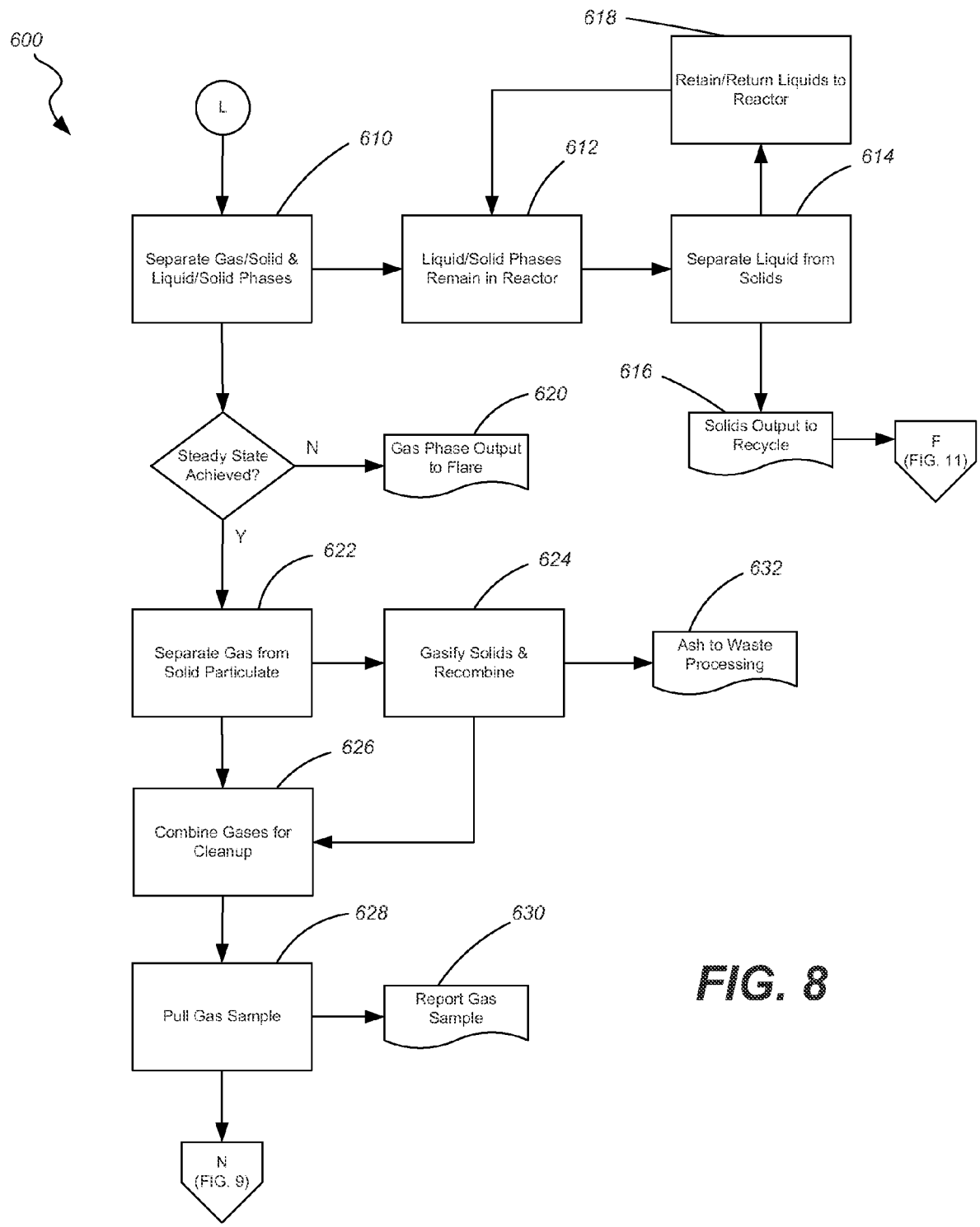
FIG. 8 is a flow diagram relating to product phase separation and conditioning in accordance with one embodiment of the present invention.

Referring now to FIG. 8, a system and process for product phase separation 600 is shown and described. Some of the separation process may actually take place within the reaction zone of the reactor. In the reaction zone, the solids and liquids will separate more easily from the vapors enabling the vapors to exit the high temperature molten bath. Entrained solids and liquids may require further effort to remove them from the gas stream. They will be returned to the reaction zone for reprocessing while the gasses are eventually conveyed to the gas cleanup and species separation unit.

As indicated at 610 various phases initially be separated. The liquid/solid phases may remain in the reactor, as indicated at 612, with the solids being removed from the liquids, as indicated at 614 and 616, and the liquids being retained in (or returned to) the mixture zone of the reactor as indicated at 618. Some of the solids are expected to be water soluble while others may not be. The process may include dissolving any water soluble solids while letting any insoluble material be filtered from the liquid before returning the liquid phase back to the reactor. Such an approach will conserve the water usage and limit the toss of sodium from the system.

At the beginning of startup, vaporous products may be outside the specified acceptable limits of one or more material characteristics requiring them to be discarded. One cost effective method may include flaring the gas, such as indicated at 620. Flaring may be performed until the stream has a desired value which may be routed for further gas cleanup and separation. As indicated at 622, solid particulates may be separated from gas phases. In one embodiment, the particulates may be filtered from the gas and then further processed. For example, the solid particulates may be subjected to elevated temperatures so as to cause the solid particulates to transition to a gaseous state, such as indicated at 624, with the resulting gasses being recombined with previously separated gasses, as indicated at 626. The combined gas stream may be subjected to further cleanup and treatment if desired as discussed in further detail below with respect to FIG. 10. The gas may be monitored to determine the content and quality of gasses being produced by the process as indicated by 628 and 630. Solids that are not gasified may include, for example, ash that is not soluble in water. Such ash may be processed, as indicated at 632, for subsequent use as road fill, in concrete or use with other appropriate materials. Otherwise, such ash may be placed in an industrial landfill.

Figure 9:
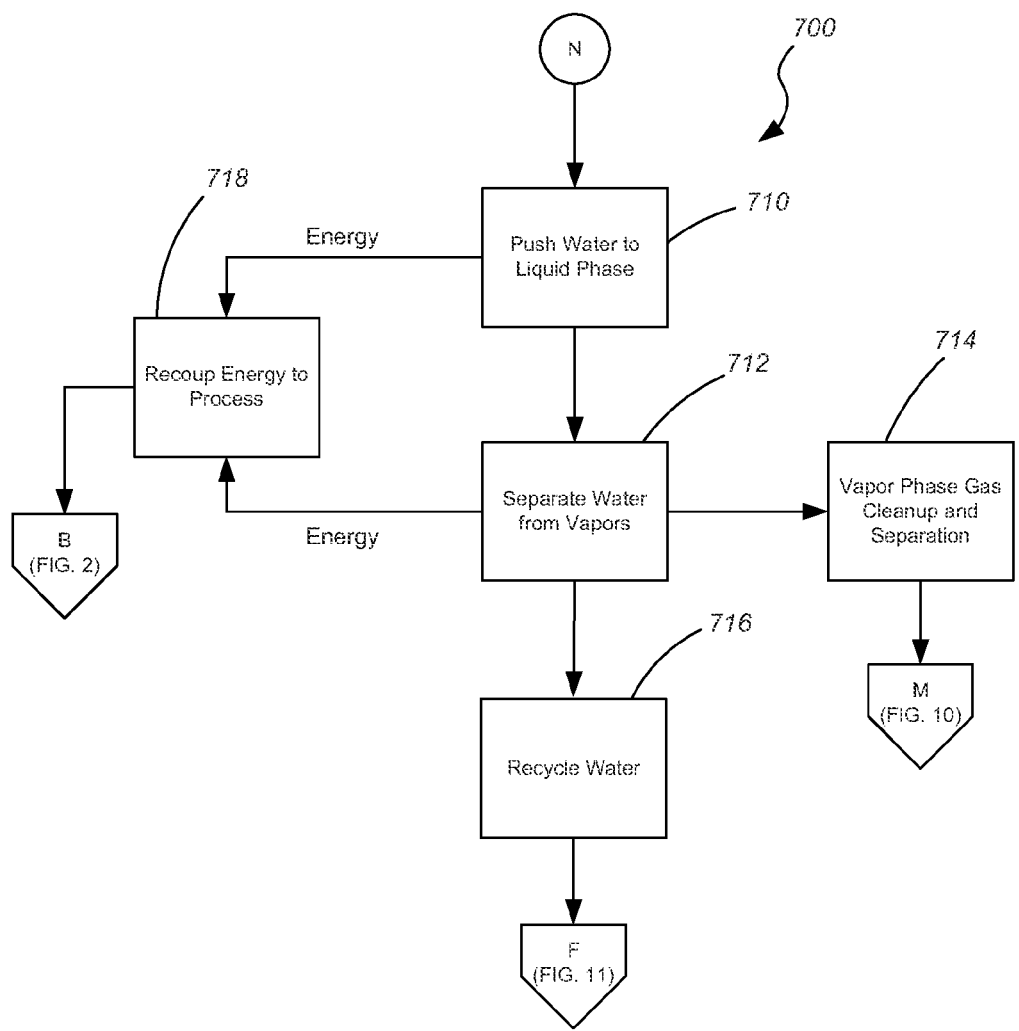
FIG. 9 is a flow diagram relating to water extraction, conditioning and recycle in accordance with one embodiment of the present invention.

Referring now to FIG. 9, the process and system associated with water extraction 700 is shown. The high temperature gasses discussed above may be conveyed through a thermal recuperation unit where the temperature of the gasses will be reduced while maintaining the system pressure. This will enable a large percentage of the water vapor to condense out of the gas stream as indicated at 710. A phase separation of liquid and gas phases of the water may then take place as indicated at 712. The water will be returned and used in the reaction again, as indicated at 714, and the vapors will be conveyed to the gas cleanup process as indicated at 716. The energy or heat released from the process of condensing water 710 and liquid/vapor separation 712 may be captured and used to raise the temperature of materials that are being brought into the process as indicated at 718.

Figure 10:
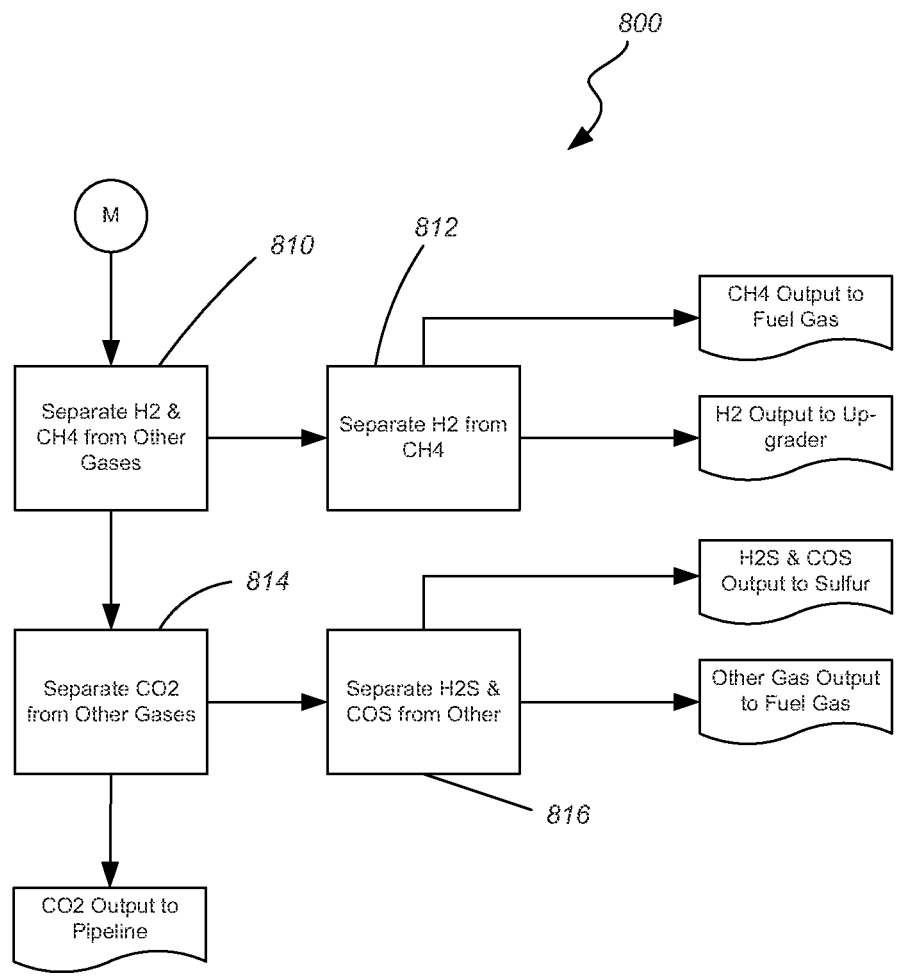
FIG. 10 is a flow diagram showing the cleanup and separation of product gasses in accordance with an embodiment of the present invention.

Referring to FIG. 10, gas processing 800 is shown in accordance with one embodiment of the present invention. In the simplest case, the gas stream will be primarily hydrogen, carbon monoxide, carbon dioxide, methane, hydrogen sulfide, and small quantities of other sulfur bearing vapors. In one embodiment, it may be desirable to separate out the gaseous constituents without experiencing a significant drop in pressure.

As shown at 810, hydrogen and methane may be initially separated from the gas stream. The hydrogen and methane may then be separated from each other, as indicated at 812, and the hydrogen may proceed to another process while the methane is passed along as a fuel gas for use elsewhere.

The remaining gas stream, the hydrogen and methane having been separated out therefrom, may be processed to separate the carbon dioxide from the remaining components as indicated at 814. The carbon dioxide, being at pressure, may be introduced into a pipeline or into storage for use as a relatively pure product stream. The remaining gas stream components may be subjected to a process for the removal of sulfur bearing gasses such as hydrogen sulfide, sulfur dioxide, and others as indicated at 816. This allows the recovery of sulfur and the use of the remaining gasses as fuels depending upon the gasses present and their associated heating value.

Figure 11:
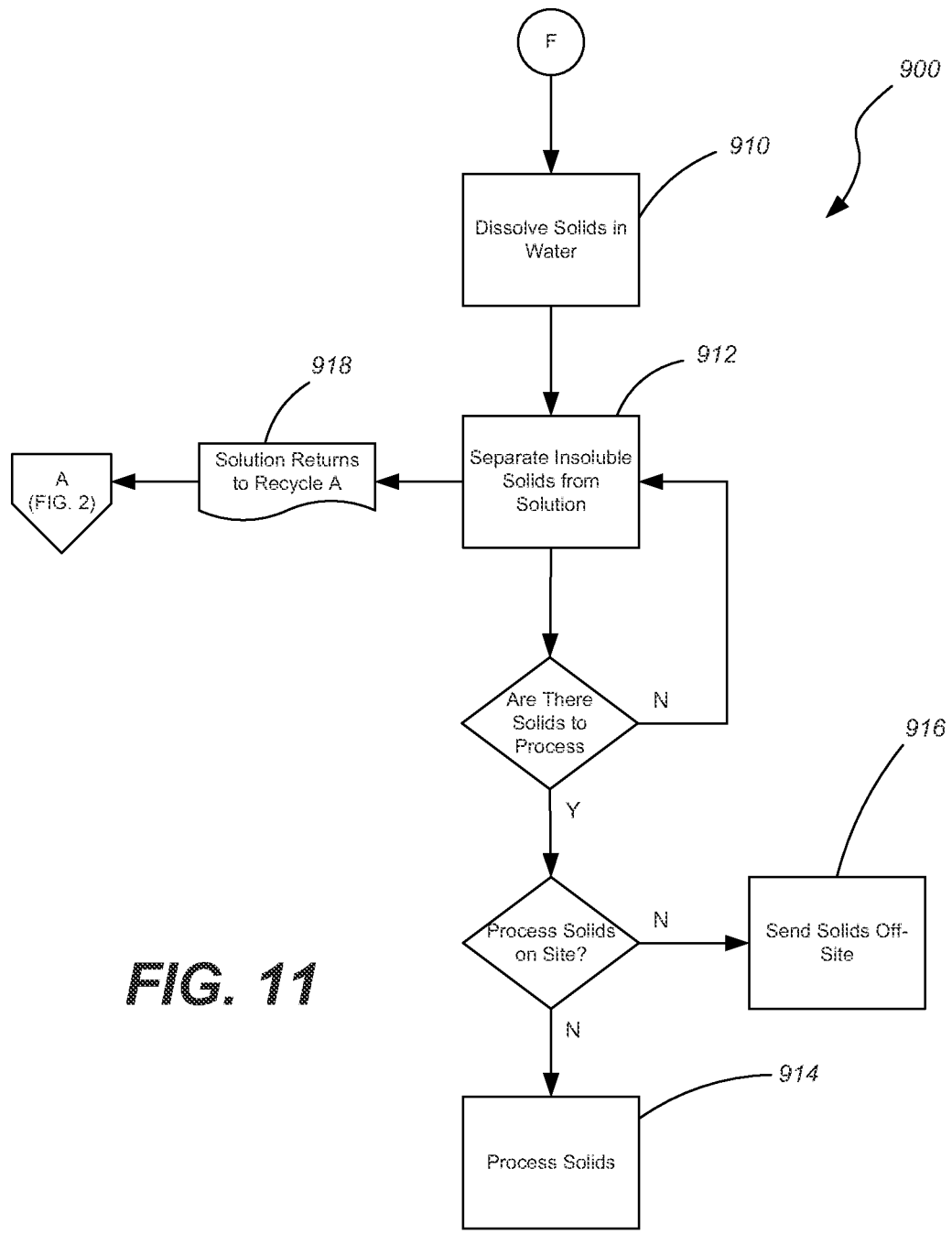
FIG. 11 is a flow diagram showing extraction, conditioning and recycle a product solids in accordance with an embodiment of the present invention.

FIG. 11 depicts a solids extraction system or process 900 where the soluble solids extracted from the reaction are dissolved in water as indicated at 910. The insoluble solid materials may then be separated from the resulting solution as indicated at 912. The solids that are not soluble may be processed on site, as indicated at 914, or shipped off-site for processing as indicated at 916, using any number of melting processes if materials of value warrant such. The materials that are soluble are separated from the solids, dissolved, and are returned to the process as indicated at 918. For example, in one embodiment, the soluble solids may include sodium and be returned to the process because the reaction melt is sodium based.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives ailing within the spirit and scope of the invention as defined by the following appended claims.

What is claimed is:

1. A method of producing gas, the method comprising:
providing a molten pool within a reactor, the molten pool comprising sodium carbonate;
introducing an oxidizing material into the molten pool;
introducing a carbon containing material into the molten pool;
reacting the oxidizing material, the carbon containing material and the molten pool at a pressure of 13.9 megapascals (MPa) or greater to produce an output stream that includes a vapor comprising hydrogen including reacting the materials according to the equilibrium equation of:

$$Na_2CO_3 + 2C + 4H_2O \leftrightarrow Na_2CO_3 + 2CO_2 + 4H_2.$$

2. The method according to claim 1, introducing a carbon containing material into the molten pool includes introducing vacuum residuum into the molten pool.

3. The method according to claim 2, wherein introducing an oxidizing material into the molten pool includes introducing softened water into the molten pool.

4. The method according to claim 3, further comprising mixing the softened water and the vacuum residuum prior to being introduced into the melt.

5. The method according to claim 3, further comprising extracting water from the output stream and recycling the water back to the molten pool within the reactor.

6. The method according to claim 3, further comprising heating the softened water to produce steam prior to introducing the water into the molten pool.

7. The method according to claim 3, further comprising creating a substantially homogenous mix of the molten pool, the vacuum residuum and the softened water.

8. The method according to claim 7, wherein creating a substantially homogenous mix further includes stirring the molten pool, the vacuum residuum and the softened water.

9. The method according to claim 1, wherein producing an output stream further includes separating liquids and gasses produced by the reactor.

10. The method according to claim 9, further comprising retaining liquids within the reactor and producing a gas stream as the output stream comprising at least methane gas and carbon dioxide gas in addition to the hydrogen.

11. The method according to claim 10, further comprising separating any entrained solids from the gas stream.

12. The method according to claim 11, further comprising separating the hydrogen gas and methane gas from the carbon dioxide and any additional gasses.

13. The method according to claim 12, further comprising separating the methane gas from the hydrogen gas.

14. The method according to claim 12, further comprising separating the carbon dioxide gas from any other remaining gasses in the output stream.

15. The method according to claim 11, further comprising dissolving any separated solids that are soluble and returning them back to the molten pool.

16. The method according to claim 1, further comprising reacting the oxidizing material, the carbon containing material and the molten pool at a temperature of approximately 930° C. or greater.

* * * * *